(12) United States Patent
Lim et al.

(10) Patent No.: US 11,546,078 B1
(45) Date of Patent: Jan. 3, 2023

(54) OPTIMIZING ROUTES ACROSS AN OPTICAL NETWORK BASED ON TRAFFIC STREAM BANDWIDTH UTILIZATION

(71) Applicant: Amazon Technologies, Inc., Seattle, WA (US)

(72) Inventors: Gary Lim, Greenwood Village, CO (US); Eric Cables, Westminster, CO (US); Meng Koon Lim, Singapore (SG)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/217,574

(22) Filed: Mar. 30, 2021

(51) Int. Cl.
*H04J 14/02* (2006.01)
*H04L 45/748* (2022.01)
*H04B 10/079* (2013.01)
*H04L 101/35* (2022.01)

(52) U.S. Cl.
CPC ...... *H04J 14/0267* (2013.01); *H04B 10/0795* (2013.01); *H04L 45/748* (2013.01); *H04L 2101/35* (2022.05)

(58) Field of Classification Search
None
See application file for complete search history.

(56) References Cited

U.S. PATENT DOCUMENTS

| | | | | |
|---|---|---|---|---|
| 7,289,437 B2 * | 10/2007 | Chiruvolu | ........... | H04J 14/0227 370/254 |
| 7,725,035 B2 * | 5/2010 | Tyan | ........................ | H04L 45/62 398/115 |
| 8,532,087 B2 * | 9/2013 | Kojima | .................... | H04L 45/50 370/352 |
| 8,761,601 B2 * | 6/2014 | Doverspike | ........ | H04Q 11/0062 398/56 |
| 9,077,478 B1 * | 7/2015 | Schmidtke | .......... | H04J 14/0257 |
| 9,413,634 B2 * | 8/2016 | Nadeau | .................... | H04L 45/50 |
| 9,608,759 B2 * | 3/2017 | Marquardt | .............. | H04L 63/12 |
| 10,038,495 B2 * | 7/2018 | Prakash | ................ | H04L 49/357 |
| 10,148,349 B2 * | 12/2018 | Chiu | ................... | H04Q 11/0066 |

(Continued)

OTHER PUBLICATIONS

Susitaival, Riikka, Load Balancing by Joint Optimization of Routing and Scheduling in Wireless Mesh Networks, 2007 (Year: 2007).*

*Primary Examiner* — Jai M Lee
(74) *Attorney, Agent, or Firm* — Klarquist Sparkman, LLP

(57) ABSTRACT

A method and system are provided for continuously monitoring bandwidth utilization in real time on a backbone of a network. Prefixes using the highest traffic can be identified and additional bandwidth can be provisioned in the form of optical transponder wavelengths. The additional bandwidth can be an express path that passes directly through optical nodes (thereby bypassing transit network devices) to the destination optical node. A centralized controller can perform the monitoring of the network devices, decide that an express path needs to be generated, and control both the network device and the optical network nodes to generate the express path from the network device, through the optical network, to the destination network device. The controller can apply and remove IP static routes and IP addresses associated with an express path. Additionally, the controller can request the setup or tear-down of an optical wavelength within the optical network.

20 Claims, 7 Drawing Sheets

(56) References Cited

U.S. PATENT DOCUMENTS

| | | | |
|---|---|---|---|
| 10,284,290 B2* | 5/2019 | Grammel | H04Q 11/0066 |
| 10,411,824 B2* | 9/2019 | Shen | H04J 14/026 |
| 10,594,393 B2* | 3/2020 | Shikhmanter | H04L 45/00 |
| 10,630,387 B2* | 4/2020 | Zheng | H04L 12/4633 |
| 10,666,359 B2* | 5/2020 | Choudhury | H04B 10/27 |
| 2004/0107382 A1* | 6/2004 | Doverspike | H04L 45/00 |
| | | | 714/4.1 |
| 2013/0156416 A1* | 6/2013 | Kim | H04B 10/032 |
| | | | 398/2 |
| 2015/0229544 A1* | 8/2015 | Alcala | H04L 43/062 |
| | | | 370/253 |
| 2015/0312658 A1* | 10/2015 | Winzer | H04Q 11/0005 |
| | | | 398/5 |
| 2017/0155462 A1* | 6/2017 | Marquardt | H04Q 11/0066 |
| 2019/0253274 A1* | 8/2019 | Van Dussen | H04L 12/4641 |
| 2020/0403907 A1* | 12/2020 | Che | H04L 45/64 |

* cited by examiner

US 11,546,078 B1

OPTIMIZING ROUTES ACROSS AN OPTICAL NETWORK BASED ON TRAFFIC STREAM BANDWIDTH UTILIZATION

BACKGROUND

A Dense Wavelength Division Multiplexing (DWDM) Optical Network can be used to implement a wide-area network to connect data centers that are separated by long distances. In DWDM, multiple optical carrier signals are multiplexed onto a single optical fiber using different wavelengths. The number of circuits that can be multiplexed over a single fiber pair is dependent on a fiber pair length (measured in fiber km). As the fiber distance increases, a smaller number of signals can be multiplexed over a single fiber pair.

DWDM Optical Networks include a plurality of optical nodes. Each optical node is equipped with a Reconfigurable Optical Add-Drop Multiplexer (ROADM) capable of routing DWDM wavelengths to two or more destinations (e.g., data centers). The ROADM allows network operators to remotely reconfigure the optical node using Application Programming Interface (API) commands. Using the API commands, the ROADM can be programmed to add or drop wavelengths without interrupting pass-through channels. The optical nodes can also include transponders that convert signals between an electrical domain and a specific wavelength. Data signals can then be combined together into a multi-wavelength signals using an optical multiplexer, which allows multiple signals to be carried on a single optical fiber.

Network devices in the electrical domain are standalone packet switching devices that only know of the existence of the next adjacent network device. Network devices are not aware of the optical network and its topology that forms the connectivity between network devices. Network planners continuously monitor bandwidth utilization between network device ports. When there is a potential for network congestion to occur between two adjacent ports, network planners execute orders to increase capacity between the two network devices. Network planners do not need to evaluate the source and destination traffic that is causing the congestion event, and, instead, rely on the network devices to find the best route through the network. However, network devices do not have visibility into the bandwidth utilization state of the entire network.

DETAILED DESCRIPTION

Generally speaking, network engineers of an IP network layer focus on network devices in the IP network and network engineers of an optical network focus on optical nodes in the optical network. Little attention is given to a holistic approach bridging both the IP network and the optical network to route traffic through both networks. A method and system are provided for continuously monitoring bandwidth utilization in real time on a backbone of a network. Prefixes using the highest traffic can be identified and additional bandwidth can be provisioned in the form of optical transponder wavelengths. The additional bandwidth can be an express path that passes directly through optical nodes (thereby bypassing transit network devices (e.g., routers)) to the destination optical node. A centralized controller can perform the monitoring of the network devices, decide that an express path needs to be generated, and control both the network device and the optical network nodes to generate the express path from the network device, through the optical network, to the destination network device. The controller can apply and remove IP static routes and IP addresses associated with the express path. Additionally, the controller can request the setup or tear-down of an optical wavelength within the optical network. If the controller fails for any reason, all IP and optical network circuits remain in an operational state until the controller returns to service.

The controller can continue to monitor traffic on the express path. If traffic on the express path drops below a threshold such that the traffic levels can be supported without an express path, the static IP route can be removed and traffic can return to the traditional path of passing through transit routers. The optical wavelength and network device-to-optical-node pair ports are removed from the express path and returned to inventory for the provisioning of the next express path traffic demand.

If an existing express path reaches a predetermined peak threshold, the controller can add an additional express path. The additional express path is configured with a similar IP static route as the first express path and is dedicated to the source and destination IP subnet traffic. The additional IP Static routes enable the source and destination network devices to load balance traffic across the two or more express paths.

Figure 1:
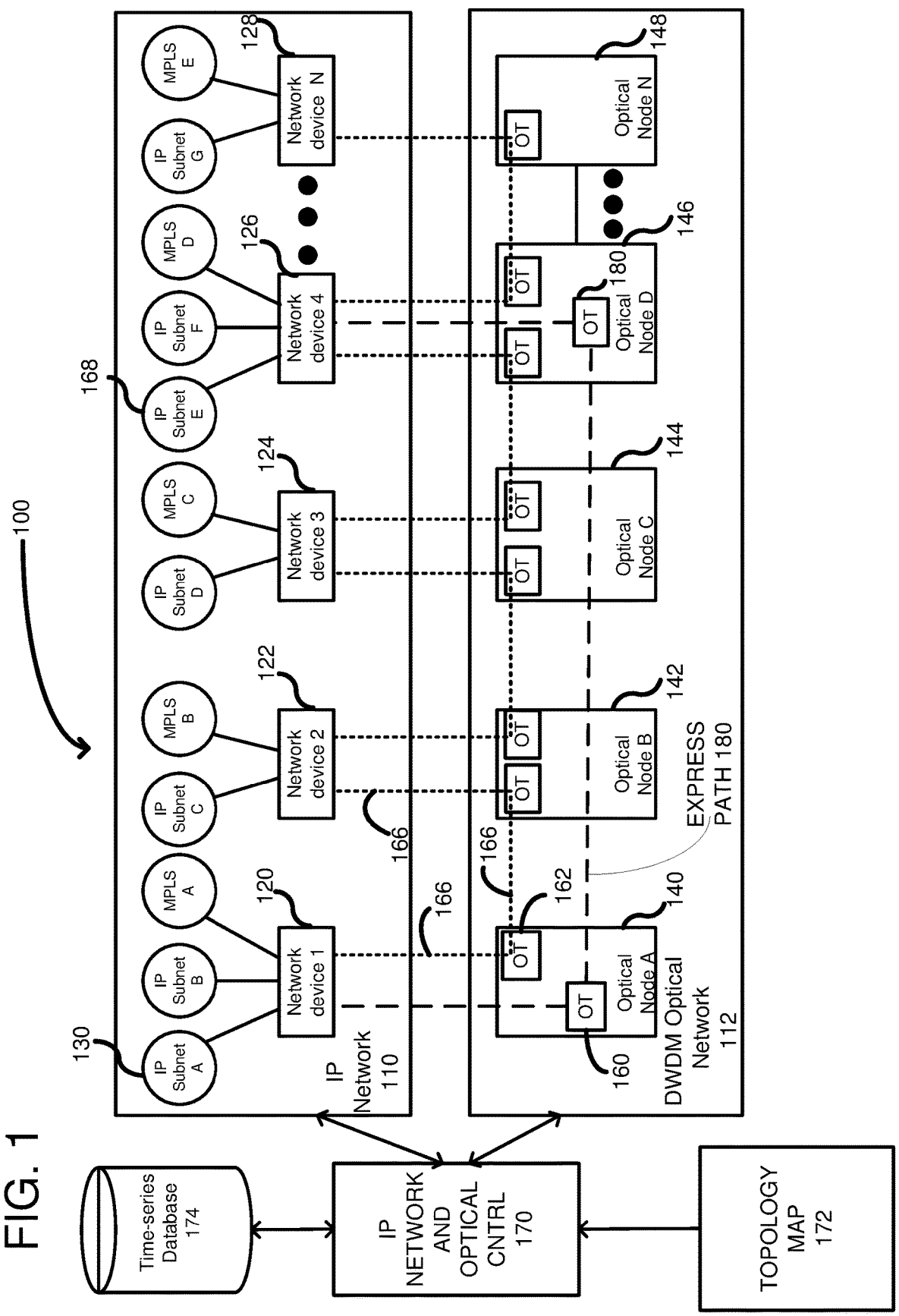
FIG. 1 is an example network including an IP (Internet Protocol) network layer and an optical network layer, with an express path generated in the optical network layer to bypass transit routers in the IP network layer.

FIG. 1 shows a system 100 including an IP network 110 and a DWDM optical network 112, which together form a wide area network. The IP network 110 includes a plurality of network devices 1-N, where N is any integer number. Example network devices include network devices 120, 122, 124, 126 and 128. Network devices can include any device used for forwarding packet data. Generally, network devices include IP routers and Multiprotocol Label Switching (MPLS) switches, but can also include any switches (multilayer or single-layer), routers, repeaters, gateways, network bridges, hubs, protocol converters, bridge routers, proxy servers, firewalls, network address translators, network interface controllers, wireless network interface controllers, for example. The network devices can support an Interior Gateway Protocol (IGP), such as IS-IS, OSPF or EIGRP, Exterior Gateway Protocol (EGP), such as BGP or Spanning Tree Protocol to determine the best available data route to the next network device. The network devices are shown coupled to various IP subnets and MPLS subnets. The IP subnets and MPLS subnets represent groups of network devices having a same prefix. For example, IP subnet A, shown at 130, includes a group of network devices having a same destination prefix. Each network device can be distant from the other network devices. For example, each network device 120, 122, 124, 126, and 128 can be in different data centers. Additionally, the network devices can be border routers, as they are coupled to the backbone of the network, which includes the DWDM optical network 112.

Figure 2:
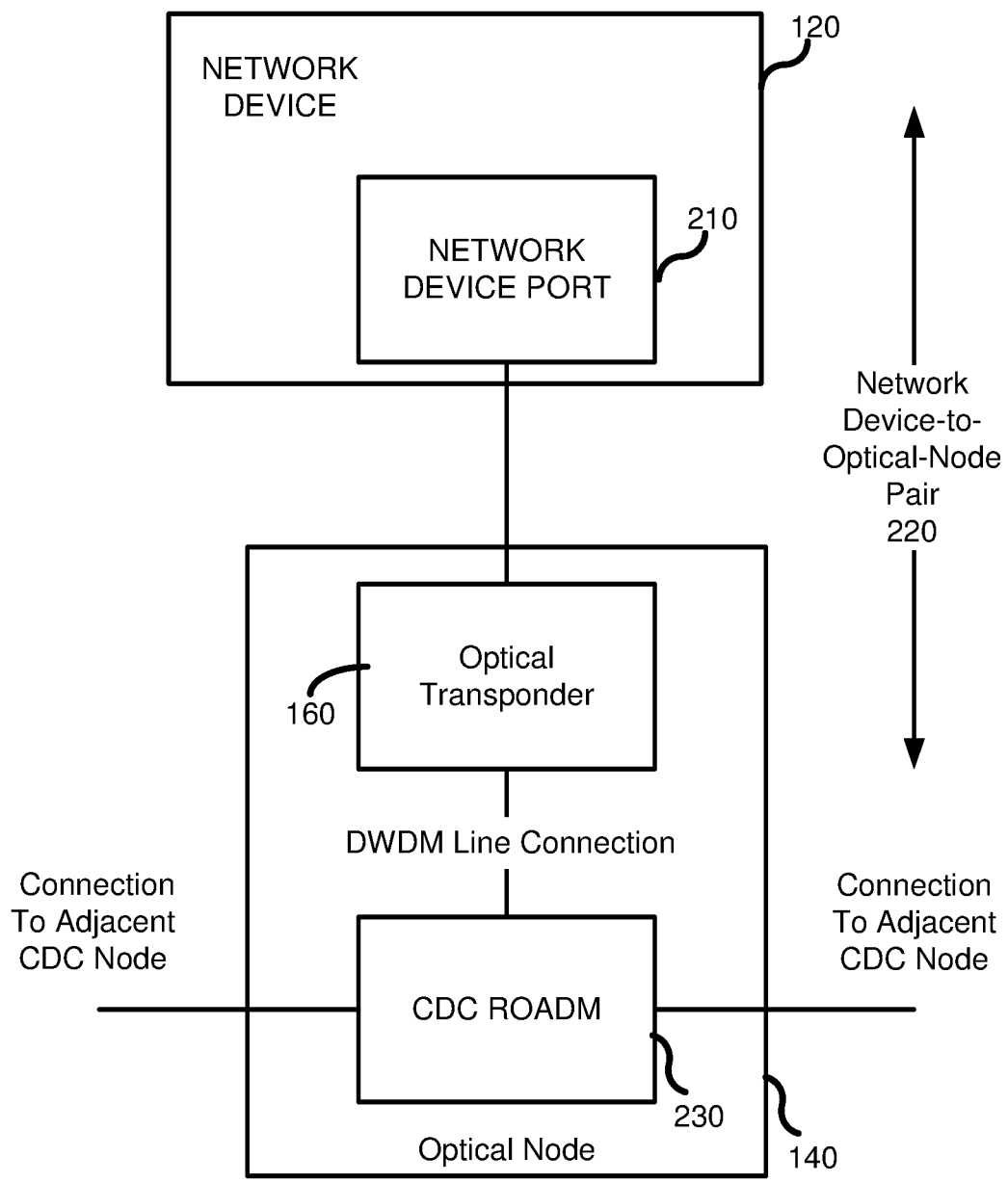
FIG. 2 shows further details of the connections between the IP network layer and an optical node in the optical network layer of FIG. 1.

The DWDM optical network 112 includes a plurality of optical nodes 140, 142, 144, 146 and 148. As shown, the number of optical nodes (N) can match the number of border network devices in the IP network 110. Each optical node includes optical transponders (OT). For example, the optical node 140 includes OTs 160, 162. The OTs can be physically inserted into a receptacle on the network devices or separated therefrom and attached with a cable (e.g., a fiber pair). As described above, the OTs convert signals from the network devices into wavelengths. Further details of the OTs are shown in FIG. 2. In a more traditional implementation, the OTs are used to connect network devices to next hops (i.e., a next closest network device). An example of such a connection is shown at 166, which includes a transmission channel from the network device 120 to the OT 162, a transmission channel between the OT 162 and the optical node 142, and a transmission channel between the optical node 142 and the network device 122. A wavelength of the transmission channel 166 is depicted as a pattern of the dotted line. In traditional networks, a transmission from network device 1 120 to network device 4 126 requires network packets to flow from network device 1 120 to network device 2 122 (which is a transit router). Then the network packets flow from network device 2 122 to network device 3 124 (which is a second transit router). Finally, the packets then flow from network device 124 to network device 126 as a border router of the packets' final destination. Network device 4 126 can then transmit the network traffic to the appropriate subnet, such as subnet 168.

As traffic continues to increase between network device 1 120 and network device 4 126, a centralized controller 170, which is an IP network and optical controller, can detect that bandwidth issues are occurring for particular prefixes. As further explained below, the centralized controller 170 can continually monitor traffic on ports of the network device 1 120 and determine which traffic is the most traffic for any destination prefix. In this example, it is assumed a prefix associated with IP subnet E 168 is the highest volume of any traffic stream. The centralized controller 170 can then modify both the IP network 110 and the optical network 112 to generate an express path 180 through the optical network to network device 4 126 while bypassing the next hop transit routers 122, 124. In particular, the controller 170 can determine that the prefix associated with IP subnet E 168 is the highest volume and then use a topology map 172 to determine that optical node 146 should be the terminating node for the express path 180. Through an API command to the optical network 112, the controller 170 can set up a new wavelength (shown by a different pattern of dashed lines) to transmit the traffic stream associated with the prefix on the express path 180. In addition, OTs 160 and 180 are generated in each of the associated nodes in order to support the source and destination OTs for the wavelength. The controller 170 can also modify routing in the network device 1 120 for the prefix from the next hop 122 directly to network device 4 126. Thus, a new wavelength is assigned for the prefix and optical nodes 142, 144 become pass-through nodes for the new wavelength of the express path 180. In this way, the network traffic on the express path 180 bypasses transit network devices 122, 124. A single controller 170 thereby controls both the IP network 110 and the optical network 112 to provide a holistic solution to bandwidth issues with the system 100 by routing traffic in the network device to the proper port connected to the optical network 112. Additionally, the controller 170 ensures that the OTs are in the proper optical nodes to support the express path 180.

The controller 170 monitors all connections between the network devices using streaming telemetry. Statistics can be sent to the controller 170 where it is stored in a time-series database 174 and analyzed by the controller 170. When the network device egress traffic reaches a predetermined link utilization, the controller analyzes the egress traffic of network device 1 120 and determines which source/destination IP traffic consumes the most capacity. The controller 170 then determines which network device and optical node the destination traffic IP subnet is connected to (e.g. IP Subnet E 168 is connected to network device 4 126 and Optical Node D 146). The controller 170 then identifies if there are available network-device-to-optical-node connections. Network-device-to-optical-node connections under the control of the controller are called a network-device-to-optical-node pair. The controller performs the same network-device-to-optical-node-pair identification on the source IP subnet. If a network-device-to-optical-node-pair is available on the source and destination, the controller issues an API command for the provisioning of a wavelength from optical node A 140 to optical node D 146. Once the wavelength has been setup between the optical nodes 140, 146, the controller 170 provisions a /30 or /31 IPv4 or IPv6 subnet to connect the source and destination network devices. An IP static route is then applied by the controller 170 on the source and destination network device to specifically route IP Subnet A 130 traffic to IP Subnet E 168, and vice versa, across the dedicated optical wavelength. All other IP traffic continues to route across the traditional paths (e.g., using transit network devices) to reach its destination IP subnets. The controller 170 can include primary/secondary controller designs with a fail-over mechanism where the time-series and controller databases are synchronized.

If IP traffic on the express path drops below a threshold such that the current traffic on the express path can be supported without the express path, the static IP route is removed by the controller and the express path source/destination IP subnet traffic is routed over the traditional connection. The optical wavelength and network-device-to-optical-node-pair ports are removed from the express path and returned to inventory for the provisioning of the next express path traffic demand.

If an existing express path reaches a predetermined peak threshold, the controller adds an additional express path. The additional express path can be configured with a similar IP static route as the first and is dedicated to the source and destination IP subnet traffic. The additional IP static routes enable the source and destination network devices to load balance traffic across the two or more express paths. In addition, if a new traffic demand (e.g. IP Subnet A to IP Subnet F) exceeds the traditional connection and there is an existing express path connecting the source and destination network devices and where the existing express path has sufficient capacity to support the new traffic, then the controller only needs to add a second IP static route to the target and source network devices for IP Subnet A and IP Subnet F traffic to route across the existing express Path.

FIG. 2 shows further details of the optical node 140 and its connection to the network device 1 120. The network device 120 includes multiple output ports, one of which is shown at 210 as coupled to the optical node 140. In this way, the network port 210 is coupled to the network backbone. Not all ports of the network device 120 need to be connected to the backbone. However, through the topology map 172 (FIG. 1), the controller 170 knows which ports on each network device are coupled to the network backbone. The optical transponder 160 is coupled to the network device port 210 through a network-device-to-optical node pair 220. In alternative embodiments, the transponder 160 can be plugged directly into the network device 120 instead of using the network-device-to-optical node pair 220. The optical transponder 160 is coupled to a Colorless-Directionless-Contentionless Reconfigurable Add-Drop Multiplexer (CDC ROADM) 230 within the optical node 140. The optical transponder 160 is under the control of the CDC ROADM 230 for the provisioning of an available optical wavelength to the target optical node. The CDC ROADM receives an API request from the controller 170 for a connection between the source and target optical nodes. The CDC ROADM 230 replies if an optical path and wavelength are available. If the optical resources are available, the controller 170 requests the CDC ROADM to commit and provision the optical circuit. In some cases, wherein the optical transponder is not a destination transponder, the CDC ROADM 230 can passthrough the wavelength to a next node. Such is the case in FIG. 1 with optical nodes 142, 144 that passthrough the wavelength associated with the express path 180.

Figure 3:
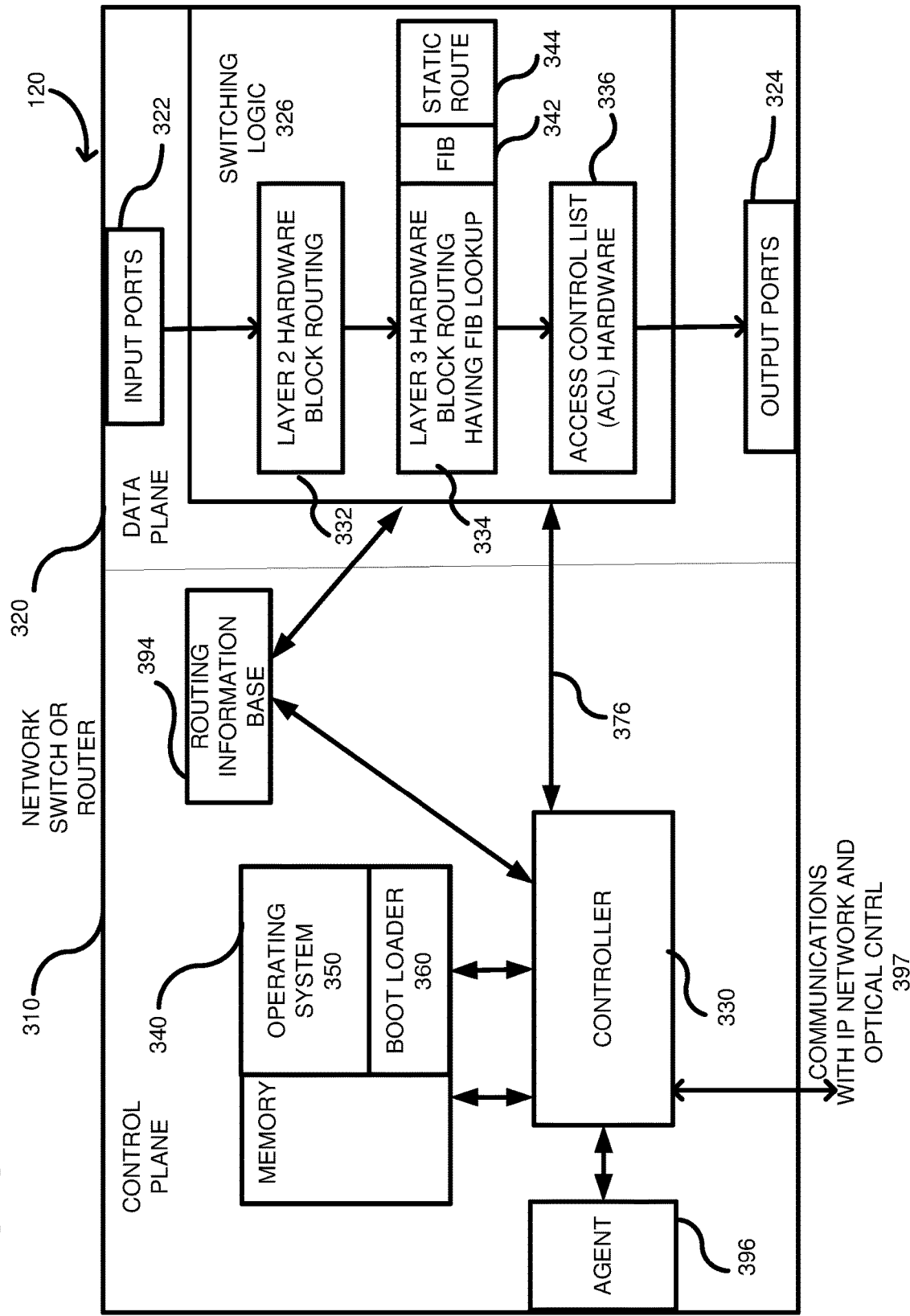
FIG. 3 shows details of a network device including static routes to facilitate routing to the optical network for selected prefixes.

FIG. 3 is an embodiment of the network device 120 that is used for forwarding packets to neighbor network devices. The network device 120 includes a control plane 310 and a data plane 320. The control plane 310 is generally a management layer for configuring, updating, and controlling the data plane 320. The control plane includes a controller 330, which can be a Central Processing Unit (CPU), processor, application-specific integrated circuit (ASIC), microcontroller, or any hardware logic that can receive packets and provide switch management and control in response thereto. The controller 330 has access to a memory 340 that can be a Dynamic Random-Access Memory (DRAM), Flash memory, or other type of RAM or ROM. The memory 340 is used to store an operating system 350 for the network device 120. The memory 340 may also include a boot loader program 360, which is a first program executed after a reboot of the controller 330, and which can run basic hardware tests before booting up the operating system 350. Although a single memory is shown, the memory 340 can be divided into multiple memories and even memories of different types. A communications bus 376 allows communications between the controller 330 and the data plane 320. The communications bus 376 can be any desired bus type, such as PCI, PCIe, AGP, etc. The data plane 320 includes input ports 322 and output ports 324 used for receiving and sending network packets, respectively.

Switching logic 326 is positioned between the input ports 322 and the output ports 324, which are typically adapted to receive network cables, such as Ethernet cables and optical fiber. The switching logic 326 can be a single ASIC integrated circuit or divided into multiple integrated circuits. The switching logic 326 can include multiple different hardware logic blocks including a Layer 2 hardware block 332, a Layer 3 hardware block 334, and an Access Control List (ACL) hardware block 336. The layer 2 hardware block 332 relates to an Ethernet layer and can forward packets based on MAC tables. The layer 3 hardware block 334 relates to forwarding based on a longest prefix match of an IP address. Layer 3 typically involves a route lookup, decrementing the Time-To-Live (TTL) count, calculating a checksum, and forwarding the frame with the appropriate MAC header to the correct output port. The route lookup of the layer 3 hardware can include searching within a Forwarding Information Base (FIB) 342, which includes destination addresses for packets being transmitted through the switching logic. A programmed static route 344 can have priority over the FIB and is used by the controller 170 (FIG. 1) to program the switching logic 326 and change the next hop for the express path. The network device A 120 can run routing protocols, such as an Open Shortest Path First (OSPF) or a Routing Information Protocol (RIP), to communicate with other Layer 3 switches or routers. One or more of the output ports 324 can be adapted to be coupled to the backbone. Whether it be the FIB or the static routes, the layer 3 hardware is used to lookup the route for an incoming packet. The ACL block 336 relates to permissions and can include rules whether to drop packets. The different hardware blocks can be coupled in series and additional hardware blocks can be added based on the design.

The controller 330 can use one or more routing information bases (RIB) 394 to generate information needed to program the layer 3 hardware 334. Different routing protocols such as BGP, IS-IS, OSPF, as well as static routes can be merged together to generate the RIB 394. An agent 396 can execute on the control plane 310 (the agent 396 can be software executing on the controller). The agent 396 can retrieve capacity information from the output ports 324 (such as from the interfaces) and transmit the capacity information to the centralized controller 170, as shown at 397. The capacity information can include prefix data (source and destination data) so that the controller 170 can determine which prefixes are causing the most traffic through the switching logic 326.

Figure 4:
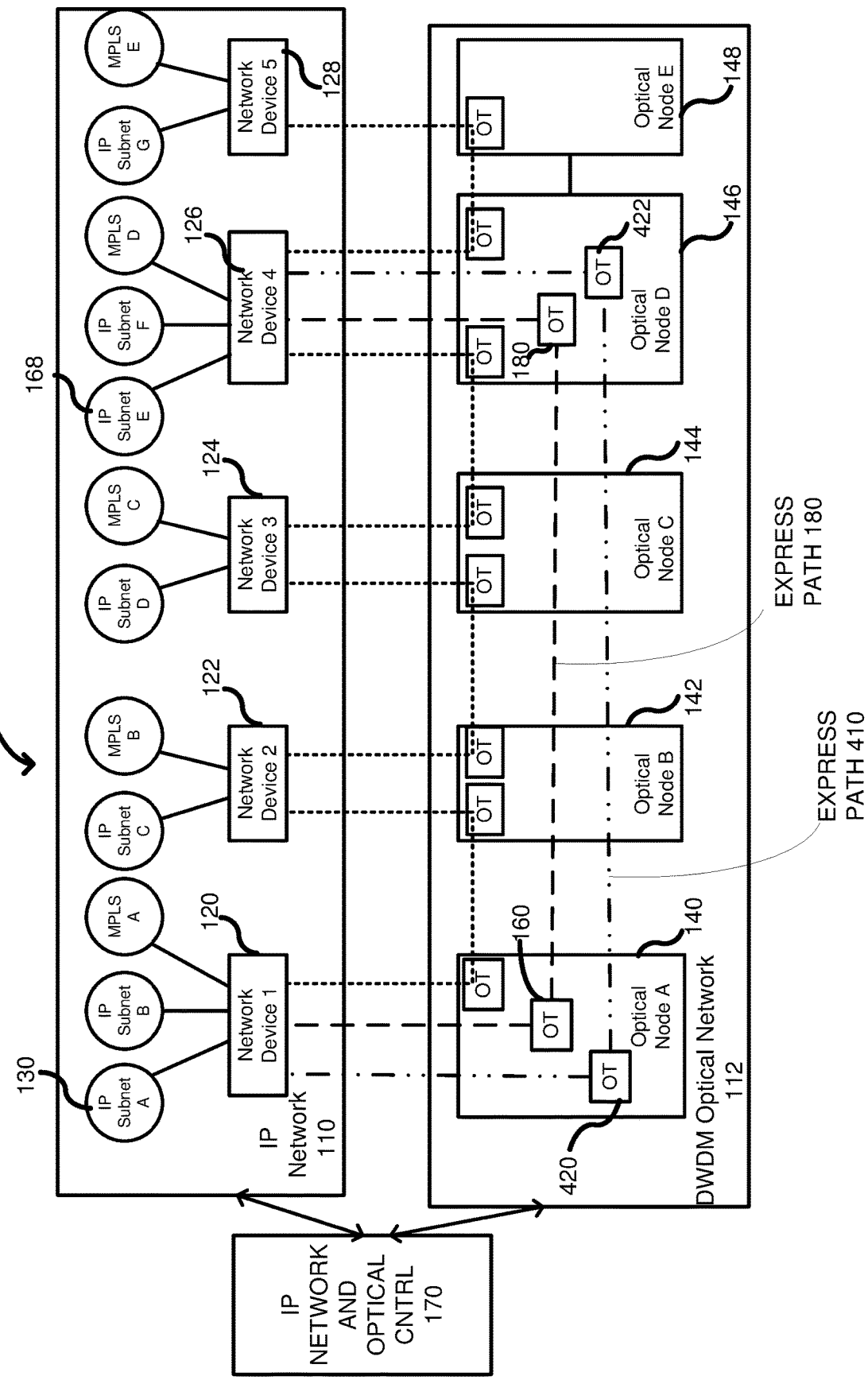
FIG. 4 is an example network illustrating that additional express paths can be added and torn down through addition of different wavelengths dedicated to prefixes that require more bandwidth.

FIG. 4 shows the system 100 of FIG. 1 with an additional express path added. By way of reminder, the controller 170 detected that network bandwidth warranted an express path 180 be added through the optical network. The express path 180 has a dedicated wavelength for all network traffic having a same network prefix (e.g., subnet 168). The controller 170 can further monitor the port in the network device 120 that is coupled to the optical node A 140 and determine that the bandwidth on the express path 180 exceeds a threshold. Thus, for example, even with the dedicated express path 180 for the prefix associated with subnet 168, additional bandwidth is needed. Accordingly, a second express path 410 can be added by the controller 170. The second express path 410 can include additional OTs 420, 422 in each of the respective nodes 140, 146. The second express path 410 carries traffic using a different wavelength than the first express path 180, but carries traffic destined for the same prefix. The network devices 120, 126 can load balance the traffic streams across the two express paths 180, 410. The controller 170 can continue to monitor network traffic and if the network traffic drops below different thresholds can decide to drop one or both express paths 180, 410 depending upon need. Alternatively, additional express paths can be dynamically added by the controller 170 by simply assigning new wavelengths to the prefix.

Figure 5:
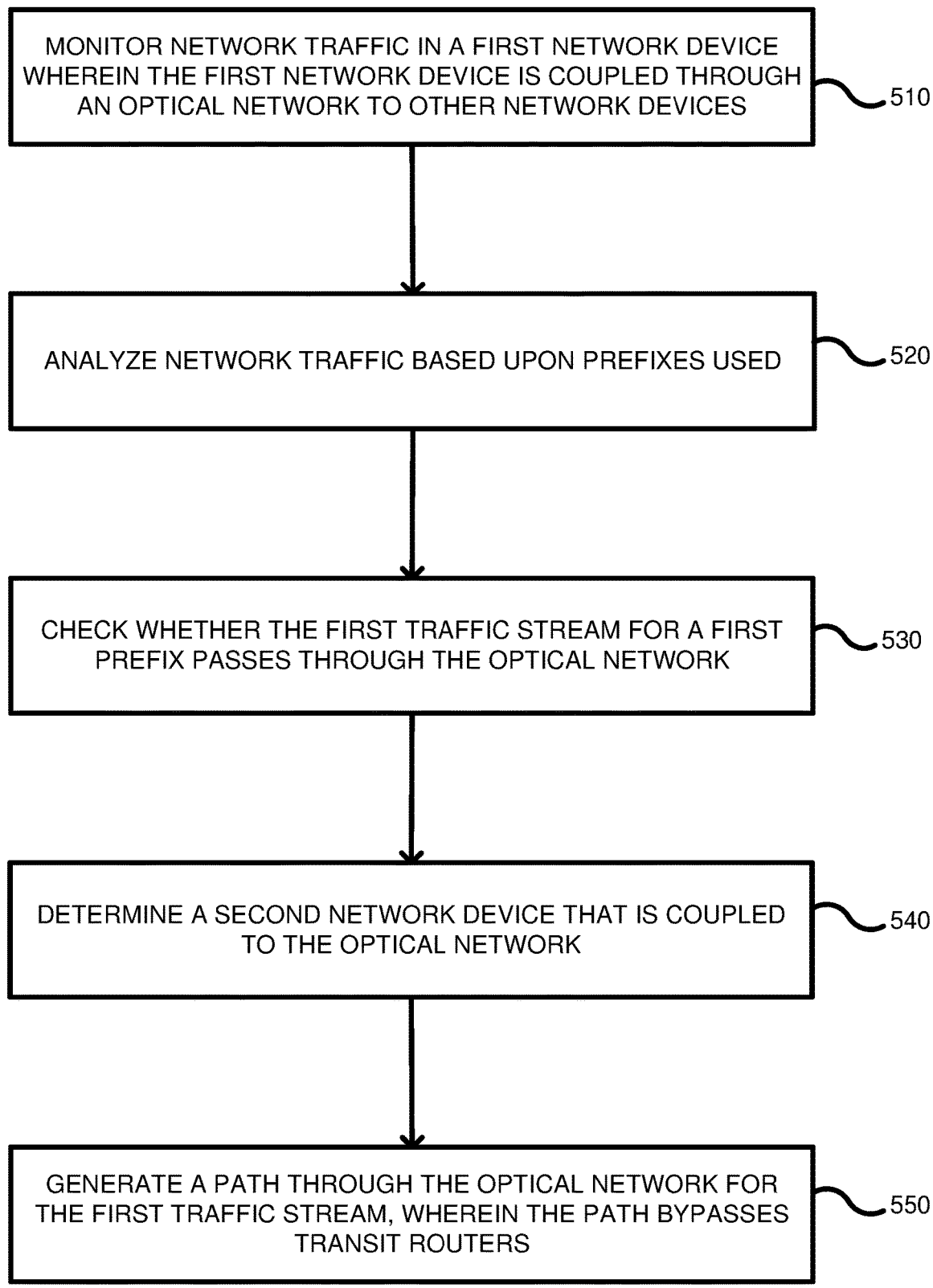
FIG. 5 is a flowchart according to one embodiment for generating an express path through the optical network.

FIG. 5 is flowchart according to one embodiment for generating an express path through an optical network. In process block 510, network traffic is monitored in a first network device wherein the first network device is coupled through an optical network to other network devices. For example, in FIG. 1, the network device 120 is coupled to other network devices 122, 124, 126 and 128, through an optical network 112. The controller 170 can monitor ports on the network devices through a local agent 396 (FIG. 3) on each network device. In process block 520, network traffic is analyzed based upon prefixes used. The monitoring data from process block 510 can be stored in a time-series database (see FIG. 1 at 174). The analyzing of the data can include searching for traffic streams destined for a same prefix. As such, the traffic streams are destined for the same border network device, such as network device 4 126 (FIG. 1). The analyzing of the data can further include ranking the traffic streams to determine which streams are using the most bandwidth. Furthermore, the analyzing of the data can include determining whether the traffic streams individually and/or as a whole are exceeding predetermined thresholds. In process block 530, a check can be made whether the first traffic stream for a first prefix passes through the optical network. For example, the controller 170 uses the topology map 172 to determine if the port through which the first traffic stream passes is connected to the backbone (i.e., the optical node A 140). In process block 540, a determination is made about the second network device coupled to the optical network. For example, the controller 170 determines, using the topology map 172, which network device is the border network device associated with the prefix. In the case of FIG. 1, the destination addresses are within subnet E 168. Accordingly, the controller 170 knows to terminate the OT at optical node D 146. At process block 550, a path is generated through the optical network for the first traffic stream wherein the path bypasses transit routers. For example, in FIG. 1, the express path 180 has a source OT 160 and a destination OT 180 in the optical nodes corresponding to network devices 120 and 126. Optical node B 142 and optical node C 144 pass the traffic stream through at the designated wavelength for the prefix. Accordingly, transit routers 122, 124 are bypassed. Thus, the controller 170 effectively changed the next hop in network device 1 120 from network device 2 122 to network device 4 126 based upon the prefix. Thus, the next hop is the border network device having a subnet corresponding to the prefix.

Figure 6:
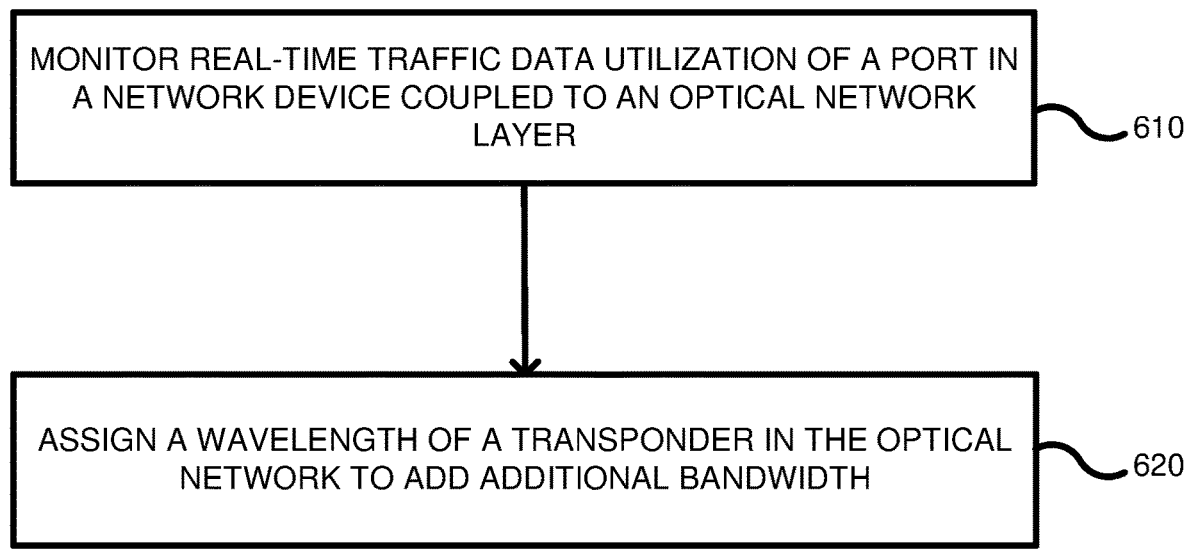
FIG. 6 is a flowchart according to another embodiment for generating an express path through the optical network.

FIG. 6 is a flowchart of a method according to another embodiment. In process block 610, real-time traffic data utilization is monitored for a port in a network device coupled to an optical network layer. For example, in FIG. 1, the optical network 112 is the optical network layer, while the IP network 110 is the IP network layer. A port on network device 1 120 can be monitored by the controller 170 (FIG. 1). Specifically, the agent 396 (FIG. 3) can monitor the output ports 324 (which can include output buffers) and transmit packet flow data to the controller 170. Such metrics can be stored in the time-series database 174 for consumption by the controller 170. In process block 620, a wavelength of a transponder can be assigned to a traffic stream (such as network traffic having a particular prefix) to add additional bandwidth to the optical network. For example, in FIG. 1, the express path 180 can have a particular wavelength dedicated to a traffic stream associated with a prefix.

Figure 7:
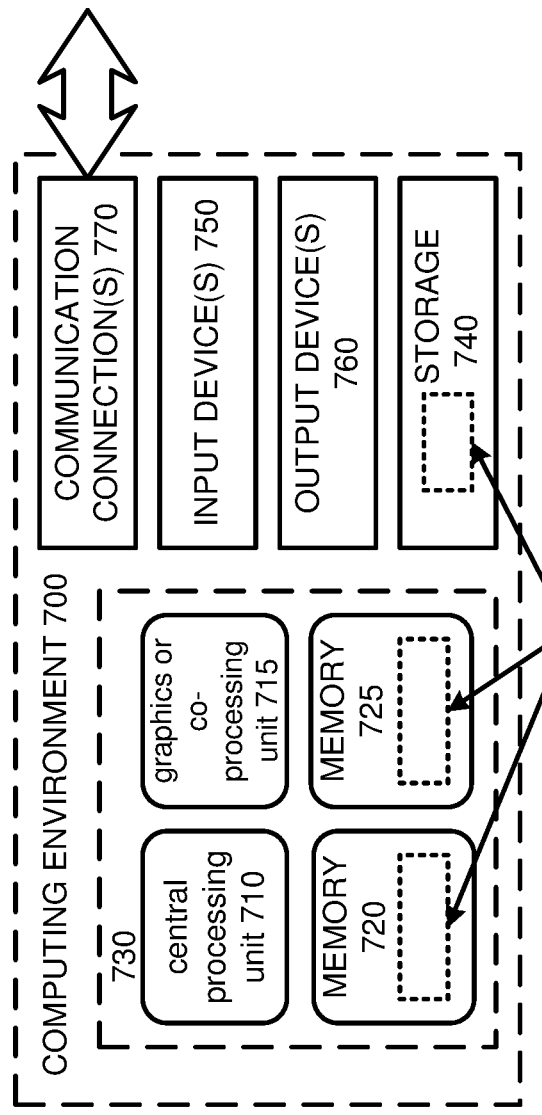
FIG. 7 depicts a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.).

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s). The controller 170 can be implemented using the computing environment 700, if desired.

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of optimizing routes across a computer network, the method comprising:
    monitoring network traffic in a first network device, wherein the first network device is within an Internet Protocol (IP) network layer of the network and wherein the first network device is coupled through an optical network via a first optical node to other network devices;
    analyzing network traffic based upon IP prefixes used for different traffic streams including a first traffic stream having a first IP prefix;
    checking whether the first traffic stream for the first IP prefix passes through the optical network;
    determining a second network device on the IP network layer that is connected to the optical network and that receives the first traffic stream;
    determining a second optical node in the optical network through topology mapping, wherein the second optical node is connected to the second network device;
    assigning a wavelength to the first IP prefix for network traffic between the first optical node and the second optical node in the optical network; and
    generating a path through the optical network for the first traffic stream, wherein the first traffic stream passes through the first optical node and the second optical node to bypass transit routers in the IP network layer.

2. The method of claim 1, wherein a centralized controller controls both the first network device and the optical network to direct the first traffic stream from the first network device through the generated path to the second network device.

3. The method of claim 2, further including programming, using the centralized controller, a static route into switching logic in the first network device to change a next hop from one of the bypass transit routers to the second network device.

4. The method of claim 1, wherein the generating of the path includes selecting the wavelength for the first traffic stream to use in the optical network.

5. The method of claim 1, wherein the path is a first path, and further including monitoring the first path for excessive bandwidth utilization by the first traffic stream and generating a second path that passes through the first and second optical nodes to bypass the transit routers, wherein the wavelength is a first wavelength and a second wavelength is used for the second path, wherein the first wavelength is different from the second wavelength.

6. The method of claim 5, further including load balancing the first traffic stream across the first and second paths by the first network device.

7. The method of claim 1, wherein the path is a first path, and further including monitoring the first path for bandwidth utilization by the first traffic stream and if the bandwidth utilization falls below a threshold, removing the first path and routing the traffic stream to the second network device through the transit routers.

8. A system, comprising:
  a network comprising a plurality of network devices interconnected by links;
  one or more monitoring servers communicatively coupled to the network, the one or more monitoring servers operable to:
  monitor network traffic in a first network device, wherein the first network device is within an Internet Protocol (IP) network layer of the network and wherein the first network device is coupled through an optical network via a first optical node to other network devices;
  analyze network traffic based upon IP prefixes used for different traffic streams including a first traffic stream having a first IP prefix;
  check whether the first traffic stream for the first IP prefix passes through the optical network;
  determine a second network device on the IP network layer that is connected to the optical network and that receives the first traffic stream;
  determine a second optical node in the optical network through topology mapping, wherein the second optical node is connected to the second network device;
  assign a wavelength to the first IP prefix for network traffic between the first optical node and the second optical node in the optical network; and
  generate a path through the optical network for the first traffic stream, wherein the first traffic stream passes through the first optical node and the second optical node to bypass transit routers in the IP network layer.

9. The system of claim 8, wherein a centralized controller controls both the first network device and the optical network to direct the first traffic stream from the first network device through the generated path to the second network device.

10. The system of claim 9, wherein the one or more monitoring servers are further operable to:
  program, using the centralized controller, a static route into switching logic in the first network device to change a next hop from one of the bypass transit routers to the second network device.

11. The system of claim 8, wherein the generating of the path includes selecting the wavelength for the first traffic stream to use in the optical network.

12. The system of claim 8, wherein the path is a first path, and wherein the one or more monitoring servers are further operable to:
  monitor the first path for excessive bandwidth utilization by the first traffic stream; and
  generate a second path that passes through the first and second optical nodes to bypass the transit routers, wherein the wavelength is a first wavelength and a second wavelength is used for the second path, wherein the first wavelength is different from the second wavelength.

13. The system of claim 12, wherein the one or more monitoring servers are further operable to:
  load balance the first traffic stream across the first and second paths by the first network device.

14. The system of claim 8, wherein the path is a first path, and wherein the one or more monitoring servers are further operable to:
  monitor the first path for bandwidth utilization by the first traffic stream; and
  if the bandwidth utilization falls below a threshold, remove the first path and route the traffic stream to the second network device through the transit routers.

15. One or more computer-readable media comprising computer-executable instructions that, when executed, cause a computing system to perform a method comprising:
  monitoring network traffic in a first network device, wherein the first network device is within an Internet Protocol (IP) network layer of the network and wherein the first network device is coupled through an optical network via a first optical node to other network devices;
  analyzing network traffic based upon IP prefixes used for different traffic streams including a first traffic stream having a first IP prefix;
  checking whether the first traffic stream for the first IP prefix passes through the optical network;
  determining a second network device on the IP network layer that is connected to the optical network and that receives the first traffic stream;
  determining a second optical node in the optical network through topology mapping, wherein the second optical node is connected to the second network device;
  assigning a wavelength to the first IP prefix for network traffic between the first optical node and the second optical node in the optical network; and
  generating a path through the optical network for the first traffic stream, wherein the first traffic stream passes through the first optical node and the second optical node to bypass transit routers in the IP network layer.

16. The computer-readable storage medium of claim 15, wherein a centralized controller controls both the first network device and the optical network to direct the first traffic stream from the first network device through the generated path to the second network device.

17. The computer-readable storage medium of claim 16, wherein the instructions, upon execution, further cause the computer system to perform the method, further comprising:
  programming, using the centralized controller, a static route into switching logic in the first network device to change a next hop from one of the bypass transit routers to the second network device.

18. The computer-readable storage medium of claim 15, wherein the generating of the path includes selecting the wavelength for the first traffic stream to use in the optical network.

19. The computer-readable storage medium of claim 15, wherein the path is a first path, and wherein the instructions, upon execution, further cause the computer system to perform the method, further comprising:
  monitoring the first path for excessive bandwidth utilization by the first traffic stream; and
  generating a second path that passes through the first and second optical nodes to bypass the transit routers, wherein the wavelength is a first wavelength and a second wavelength is used for the second path, wherein the first wavelength is different from the second wavelength.

20. The computer-readable storage medium of claim 15, wherein the path is a first path, and wherein the instructions, upon execution, further cause the computer system to perform the method, further comprising:
  monitoring the first path for bandwidth utilization by the first traffic stream; and
  if the bandwidth utilization falls below a threshold, removing the first path and routing the traffic stream to the second network device through the transit routers.

* * * * *